United States Patent [19]

Jaehn

[11] 3,735,994
[45] May 29, 1973

[54] WORK HOLDING CHUCK AND ARBOR

[75] Inventor: Edwin C. Jaehn, Rochester, N.Y.

[73] Assignee: The Gleason Works, Rochester, N.Y.

[22] Filed: Dec. 6, 1971

[21] Appl. No.: 205,220

[52] U.S. Cl..........................279/1 G, 279/2, 269/48.1
[51] Int. Cl............................B23b 31/40, B23f 23/06
[58] Field of Search................................279/1 G, 2; 269/48.1

[56] References Cited

UNITED STATES PATENTS

| | | | |
|---|---|---|---|
| 3,674,280 | 7/1972 | Pedersen | 279/2 |
| 3,437,342 | 4/1969 | Mann | 279/2 |

Primary Examiner—Francis S. Husar
Attorney—Morton A. Polster

[57] ABSTRACT

A chuck is provided employing a dish-shaped arbor with an elongated shoulder portion inclined rearwardly from a collar section to an outer periphery attached to an upstanding flange portion having a work-gripping face. Upon axial flexure of the arbor, the novel combination of the elongated shoulder and a tapered expander portion co-operate to impart parallel radial expansion of the work-gripping face to a workpiece bore thereby causing the bore to be gripped in substantially full-area abutment rather than in "line" contact as in prior art arbors. Also provided are air passages for supplying air under pressure to an annular groove in the surface of the work-gripping face to prevent possible entry of abrasive particles from entering between the work-gripping face and the workpiece bore.

12 Claims, 2 Drawing Figures

WORK HOLDING CHUCK AND ARBOR

This invention relates to work-holding chucks and, more particularly, to a chuck capable of being used with automated machinery and to an arbor member therefor of novel design for providing remarkable expansion while maintaining substantially coincident abutment with the bore of a chucked workpiece.

BACKGROUND OF THE INVENTION

The prior art abounds in all sizes and shapes of chucks which include expansible arbors acting to grip the inner bore of a part and, simultaneously, to draw the part rearwardly against a seat on the chuck. Among such well known prior art devices are the chuck mechanisms shown in U.S. Pat. Nos. 3,036,838 issued on May 29, 1962 to Harry J. Barber and 2,453,262 issued on Nov. 9, 1948 to J. M. Peters, both assigned to the assignee herein. The former discloses an expansible arbor comprising two resilient annular dish-shaped members which, upon axial flexure, expand to grip a gear bore, while the latter patent discloses a chuck employing a cup-shaped arbor in combination with a tapered expander for expanding the arbor to fill the gear bore.

The prior art expansible arbors just referred to above represent two relatively successful designs, but both still suffer from two major problems. Firstly, such prior art arbors do not completely prevent contamination of the chuck interior while the workpiece is being sprayed with compound during cutting or lapping and, secondly, contaminating fluid (e.g., abrasive lapping compound) can become lodged between the arbor and the workpiece, thereby sometimes causing scoring of the bore of the workpiece on its removal from the arbor or sometimes even resulting in sufficient loss of tolerance between the arbor and the bore of the workpiece to make it difficult to remove the workpiece following dechucking. In manually operated machinery, this chuck contamination is controlled to some extent by having an operator wipe the arbor and chuck clean following each machine operation, and the necessity for such hand wiping between machine operations has militated heretofore against the automation of lapping machinery requiring the use of such chucks.

It will be appreciated that, theoretically, an arbor should be designed so that, upon flexure, the flat cylindrical surface of its work-gripping outer circumference will be in substantially coincident abutment with the flat cylindrical bore of the workpiece to provide the desired tight fit. However, in actual practice, the work-gripping portions of prior art arbors often fail to abut the bores of workpieces in substantial flat area coincidence because one end of their outer surface actually experiences a greater change in circumference than does the other end, thereby causing the arbor to grip the workpiece along a single "line" of contact and permitting contaminating fluid to lodge between the bore and arbor. For instance, in the type of prior art chuck referred to above which expands by drawing a cup-shaped arbor over a tapered surface, such "line" contact results because the circumference of the "mouth" of the cup-shaped arbor increases while its shoulder portion retains its original circumference.

Further, when prior art arbors have been designed to satisfactorily overcome the chuck contamination problem, such as the arbors referred to above comprising pairs of dish-shaped members, such arbors suffer from minimal expansibility, i.e., the circumference of their work-gripping portions does not change much between their chucked and unchucked states. This narrow tolerance greatly increases the cost of automatic loading equipment. In addition, as an arbor wears, it is necessary for it to expand further to maintain adequate gripping torque and, therefore, the lesser the expansion capabilities of an arbor, the more frequently it must be replaced. Since the precision arbors required for automatic machinery are quite expensive, such frequent replacement is particularly undesirable.

BRIEF SUMMARY OF THE INVENTION

The invention disclosed herein overcomes these prior art problems by a novel improvement in the design of such chucks and their co-operating arbor members. A dish-shaped arbor is provided with an elongated shoulder portion inclined rearwardly from a collar section to an outer periphery attached to an upstanding flange portion for gripping the workpiece. The flange portion has a tapered inner face designed for mating engagement with a similarly tapered hub in the chuck body. Upon axial flexure of the arbor, the circumference of one end of the flange portion expands in response to the relative movement of the mating tapered surfaces, while radial movement of the outer periphery of the elongated shoulders increases the circumference of the other end of the flange portion. This "parallel" expansion permits the outer circumferential surface area of the flange to grip the bore of the workpiece in substantially coincident abutment rather than line contact. In addition, this novel combination greatly increases the expansibility of the arbor, thereby increasing the life of the arbor significantly by providing greater wear compensation. This increase in expansibility may be as much as twice the expansibility of prior art chucks and arbors, while maintaining the desired coincident abutment during chucking.

Also, as is done in at least one known prior art device, to further reduce the possibility of contamination of the interior of the chuck mechanism an annular groove is formed in the outer circumference of the arbor member and high pressure air is fed into this groove, as well as between the arbor member and the chuck body, at least during operating periods when contaminating lapping compound is being applied to the workpiece.

DETAILED DESCRIPTION OF THE INVENTION

Figure 1:
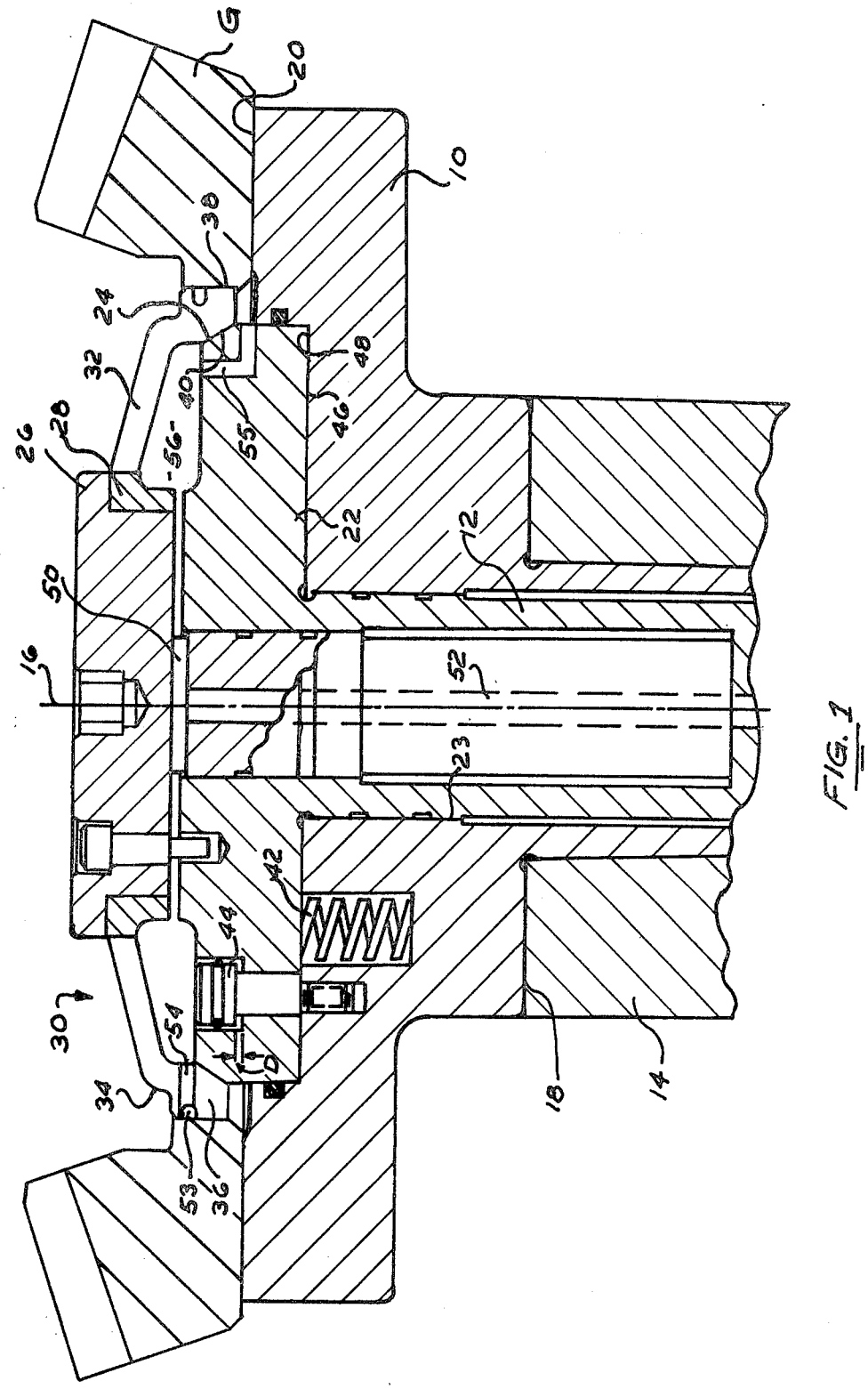
FIG. 1 is a section through the chuck and a bevel ring gear held thereby in a plane containing their axis of rotation.
Figure 2:
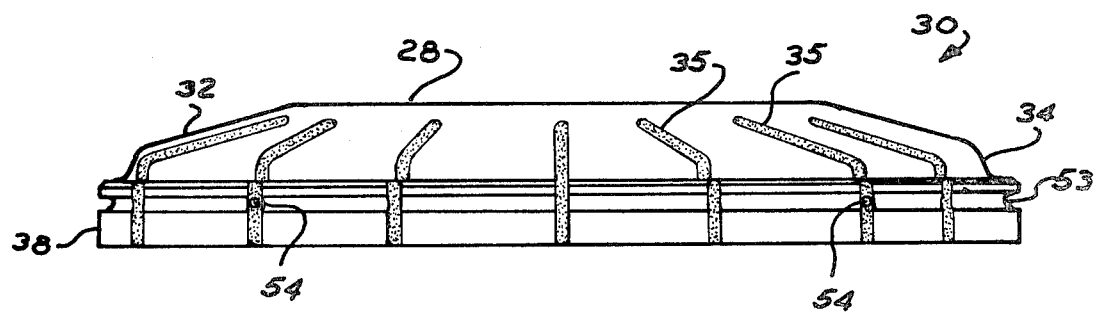
FIG. 2 is a side elevation of the arbor appearing in FIG. 1.

Turning now to the drawings, in FIG. 1, the chuck according to the invention herein comprises a body 10 having a tapered shank 12 fitted in a tapered bore in a machine spindle 14 whose axis of rotation is designated 16. Body 10 has a shoulder 18 for seating upon the front face of the spindle, and front face 20 of the body 10 constitutes a seat for the rear face of a ring-shaped part G (in this case a bevel ring gear). Projecting forwardly from the front of body 10 is a cylindrical hub 22 having a tapered annular surface 24. Extending through body 10, and hub 22, there is a cylindrical bore 23. Both this bore and the outer cylindrical surface of hub 22 are coaxial with rotation axis 16. A headed draw bolt 26 has at one end a screw-threaded portion for connection to an actuating mechanism of the type well known in the art.

An expansible arbor 30, having a generally dish-shaped form, is mounted for expansion on hub 22 and is precisely centered by means of the precision head of draw-bolt 26 which is received in the bore of a collar 28 of the arbor. The arbor 30 also has an elongated shoulder portion 32, inclined rearwardly from the collar to an outer periphery 34, and an upstanding flange portion 36 extending rearward from the outer periphery 34. On the outside of upstanding flange 36 is the actual work gripping face 38 for engaging and firmly gripping the bore of a workpiece during the chucking operation. On the inside surface of flange 36 is a tapered inner face 40 designed for mating engagement with the corresponding tapered surface 24 of hub 22. Also, as is well known in the art, a plurality of radial slots 35 extend inwardly from the outer periphery of the arbor for the purpose of increasing the resiliency. Intermediate radial slots 35, a webbing material of suitably resilient and compressible rubber or plastic is provided.

In operation, a gear G is placed on the chuck with the chuck mechanism in its de-chucked condition and arbor 30 uncompressed. It should be noted that the chuck mechanism is shown in its chucked position in FIG. 1. Normally, prior to chucking hub 22 is urged forward (by a plurality of springs 42) against the bottom of a plurality of headed screws 44 a distance D. Draw bolt 26 is then drawn rearwardly, relative to spindle 14 by a power-operated chuck actuator or other suitable means (not shown). This rearward movement of the draw bolt, imparts an initial compression or flattening of arbor 30. As arbor 30 is initially compressed, the interacting of tapered surfaces 24 and 40 first causes an increase in the circumference of the rearward portion of work-gripping face 38 to grip the gear bore firmly along a line of contact. As draw bolt 26 continues its rearward movement, upstanding flange portion 36 is gradually "wedged" between tapered surface 24 and the gear bore, and the resistance of springs 42 is gradually overcome until surface 46 of hub 22 abuts bottom surface 48 of body 10. At this point, the gear is firmly gripped and held against front face 20. Slightly further rearward movement of draw bolt 26 then further compresses dish-shaped arbor 30, resulting in the radially outward movement of outer periphery 34 of shoulder portion 32 and upstanding flange 36 and thereby increasing the circumference of the forward section of work-gripping face 38 to bring it into substantial flat-area coincide with the gear bore.

The last-mentioned radial expansion of the forward section of work-gripping face 38 can be best understood if shoulder portion 32 is visualized as a beam pivotally connected at its respective ends to collar portion 28 and flange 36. Since collar portion 28 is restricted to move only parallel with the axis 16 and the rearward portion of flange 36 is wedged against further rearward motion, as the incline of the beam decreases its outer end must move outward radially, thereby increasing the circumference of the upper part of face 38.

As a further aid to the protection of vital interior chuck parts and of work gripping face 38 from contamination by abrasive compounds, air under pressure is supplied to annular channel 50 from a suitable source (not shown) through passage 52 to fill the chamber 56 formed between arbor 30 and hub 22. Air passages 55 direct air from chamber 56 to the cavity formed between hub 40, upstanding flange 36, and gear G, and a plurality of air passages 54 supply air under pressure to an annular groove 53 in the surface of work-gripping face 38, thereby preventing the possibility of any abrasive particles from entering between work-gripping face 38 and the bore of the gear in the event of machining discrepancies in the bore or distortion of the resilient webbing material which fills slots of arbor 30.

What is claimed is:

1. In a chuck for a ring gear or like part having:
   a body including a front face with a seat for the back face of the gear and a central bore extending therethrough,
   cylindrical hub means projecting forwardly from the front face, the axes of the bore and hub means being coincident with the axis of rotation of the chuck,
   a draw bolt slidable in the bore and having head means spaced forwardly from the hub means, and
   an annular arbor member seated between the head and hub means and adapted to expand to grip the bore of the part upon rearward motion of the draw bolt in the body, the improvement wherein said arbor member is dish-shaped and comprises:
   a collar surrounding a central bore,
   an elongated shoulder portion inclined rearwardly from the collar to an outer periphery, and
   an upstanding flange portion extending rearward from the outer periphery of said shoulder portion and including:
   an outer, work-gripping face substantially parallel to said axis of rotation, and
   a tapered inner face, and wherein said hub means includes
   a tapered surface for mating engagement with the inner face of the flange on rearward motion of the draw bolt.

2. A chuck according to claim 1 wherein said arbor member has a plurality of slots extending radially inward through the flange and shoulder portions.

3. A chuck according to claim 2 wherein said slots are filled with a resilient webbing material.

4. A chuck according to claim 1 wherein said hub means is movable to a forward de-chucked position upon forward movement of the draw bolt and to a rearward chucked position upon rearward movement of the draw bolt.

5. A chuck according to claim 4 wherein said hub means is biased toward said de-chucked position.

6. A chuck according to claim 5 wherein the force biasing the hub means is great enough to prevent rearward movement of the hub means until the engagement of said tapered surfaces expands the flange of the arbor member to grip the bore of the part.

7. A chuck according to claim 1 further comprising passages for delivering air under pressure between the hub means and the arbor member.

8. A chuck according to claim 7 wherein said outer work-gripping face includes an annular groove and an air passage connecting the groove and the inner face of the flange.

9. A work-holding arbor for use in a chuck for a ring gear or like part wherein said arbor is received between a hub means and the head portion of a draw bolt concentric with the rotational axis of the chuck and is expanded to grip the bore of the part by movement of the draw bolt, said arbor being dish-shaped and comprising:
- a collar surrounding a central bore,
- an elongated shoulder portion inclined rearwardly from the collar to an outer periphery, and
- an upstanding flange portion extending rearward from the outer periphery of said shoulder portion and including:
  - an outer, work-gripping face substantially parallel to said axis of rotation, and
  - a tapered inner face.

10. An arbor according to claim 9 having a plurality of slots extending radially inward through said flange and shoulder portions.

11. An arbor according to claim 10 wherein said slots are filled with a resilient webbing material.

12. An arbor according to claim 9 wherein said outer work-gripping face includes an annular groove and an air passage connecting the groove and the inner face of the flange.

* * * * *